March 14, 1967 J. NAGY, JR., ET AL 3,309,498
CONTROLLED TEMPERATURE CHAMBER
Original Filed Dec. 31, 1963 2 Sheets-Sheet 2
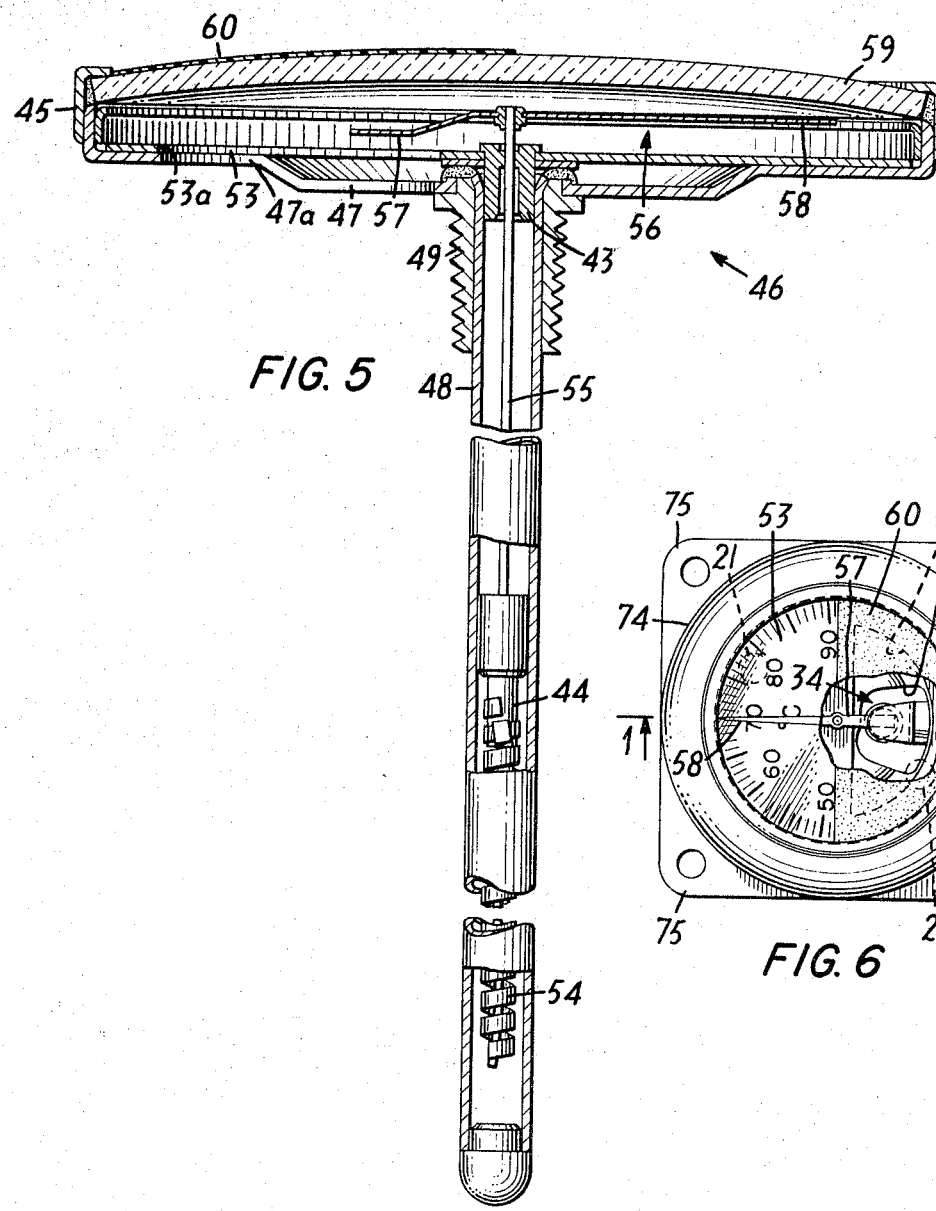
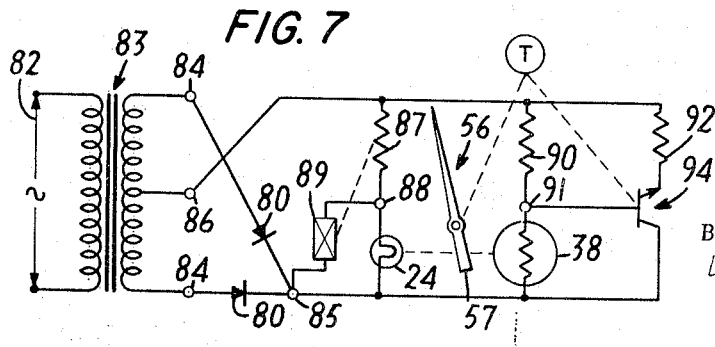
INVENTORS.
JOHN NAGY, JR. &
ROMAN I. ANDRUSHKIW
BY
Brumbaugh, Free, Graves & Donohue
their ATTORNEYS United States Patent Office 3,309,498
Patented Mar. 14, 1967

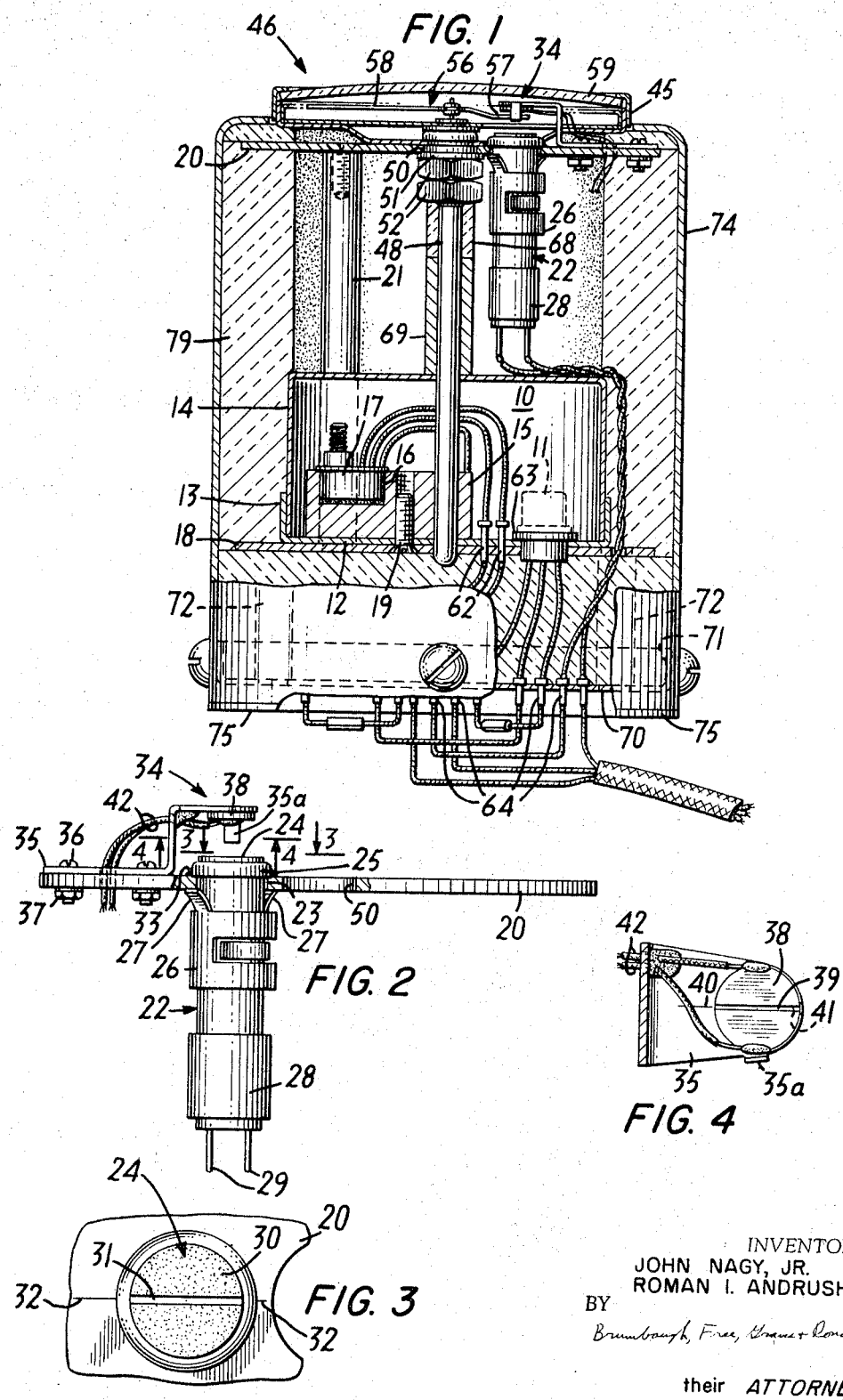

3,309,498
CONTROLLED TEMPERATURE CHAMBER
John Nagy, Jr., Union, and Roman I. Andrushkiw,
Newark, N.J., assignors to Daystrom, Incorporated,
Murray Hill, N.J., a corporation of Texas
Continuation of abandoned application Ser. No. 334,745,
Dec. 31, 1963. This application Mar. 11, 1966, Ser.
No. 533,729
5 Claims. (Cl. 219—210)

This application is a continuation of application Ser. No. 334,745, filed Dec. 31, 1963, now abandoned.

This invention relates to a method and apparatus for controlling the temperature of a closed chamber and, more particularly, to a temperature controlling method and apparatus wherein the application of heat to the chamber is automatically controlled so as to maintain a constant temperature within the chamber.

In many fields, and perhaps more particularly the electrical and electronic arts, it is necessary or desirable to maintain an element at a predetermined constant temperature. For example, such devices as thermoelectric reference junctions or temperature sensitive solid state devices may require a constant temperature environment for proper operation.

In general this is achieved by mounting the element in a closed housing or chamber incorporating a heat source controllable by a temperature responsive device. One of the devices which have been employed for this purpose in the past is a thermal switch, which uses a bimetallic contact element as the switch arm to turn an electrical heating element on and off as the temperature in the chamber falls below or rises above the desired temperature, respectively. Prior art chambers controlled in this manner necessarily oscillate or hunt about the desired temperature, since the heat source is turned on or off only after an incremental change in temperature within the chamber. The use of a mechanical contact switch also introduces unreliability due to corrosion and arcing at the contacts. Furthermore, variations in line voltage can affect the temperature regulation, necessitating the use of a regulated power supply in some instances. This, in turn, increases the complexity and power drain of the chamber, while reducing its reliability.

Accordingly, it is the primary object of the present invention to provide an improved controlled temperature chamber which avoids the disadvantages of known constructions.

Another object of the invention is to provide a novel method and apparatus for automatically controlling the heat energy supplied to such a chamber.

A further object of the invention is to provide an improved method and apparatus for controlling the temperature of such a chamber which automatically compensates for variations in ambient temperature and supply voltage.

Still another object of the invention is to provide an improved method and apparatus for controlling the temperature of a chamber with a high degree of stability and reliability.

These and other objects and advantages of the invention are attained by utilizing a photosensitive device for controlling the heat source and adjusting the amount of radiant energy striking the photosensitive device in accordance with the temperature of the oven.

In one form of the apparatus according to the invention, a lamp illuminates a photoconductive cell which controls the gain of an amplifier circuit. The circuit includes a power transistor whose power dissipation while operating supplies the heat for the chamber. A temperature sensitive element continuously senses the temperature within the chamber and has a movable member disposed between the lamp and the photoconductive cell to control the amount of light striking the cell in accordance with the temperature of the chamber. The chamber is thus maintained at the desired constant temperature.

The apparatus automatically adjusts for variations of supply voltage and ambient temperature, but provision is made for additional automatic compensation against such changes by adjusting the light energy radiated by the lamp. The temperature sensitive element also includes a dial arrangement for indicating the temperature of the chamber.

All of the above is more fully explained in the detailed description of a preferred form of the invention which follows, this description being illustrated by the accompanying drawings wherein:

FIG. 1 is an elevational view in section of the overall apparatus according to the invention;

FIG. 2 is an enlarged elevational view of a portion of the apparatus of FIG. 1;

FIG. 3 is an enlarged fragmentary view, taken along the line 3—3 of FIG. 2 and looking in the direction of the arrows;

FIG. 4 is an enlarged fragmentary view, taken along the line 4—4 of FIG. 2 and looking in the direction of the arrows;

FIG. 5 is an enlarged sectional view of the thermometer assembly used in the embodiment shown in FIG. 1;

FIG. 6 is a top plan view of the embodiment shown in FIG. 1; and

FIG. 7 is a schematic illustration of an electrical circuit of the preferred form of the invention.

Referring now to FIG. 1 of the drawing, the chamber 10 whose temperature is to be controlled, is surrounded by a housing comprising a base portion 12 having an upstanding peripheral flange 13, and an inner can 14 adapted to make a friction fit with the peripheral flange of the inner cover. Both the inner can and the base portion are made preferably of a good thermal conductor such as aluminum. Secured to the base portion 12 is a heat sink 15 formed of a block of a good thermal conductor such as aluminum. The heat sink is recessed to form a chamber 16 adapted to receive with a close tolerance fit a power transistor 17, which is the heating element for the chamber 10. The element 11 shown in dotted line, represents the transistor or other device requiring the controlled temperature environment.

The housing is mounted on the bottom plate 18 by a screw 19 which passes through the base portion 12 and engages the heat sink 15, thereby securing it to the inner cover. A top plate 20 is mounted in spaced relation to the bottom plate 18 by a plurality of long spacers 21 fastened such as by screws to the top and bottom plates.

As seen more clearly in the enlarged detail of FIG. 2, which is a view of the apparatus from a direction opposite to FIG. 1, a lamp assembly 22 is mounted in an aperture 23 in the top plate 20. The lamp assembly includes a small incandescent bulb 24 whose body has a flange portion 25 which abuts one side of the top plate. A spring clip 26, which makes a tight frictional fit with the lamp body, has a plurality of protruding prongs 27 which bear against the other side of the top plate to hold the lamp assembly firmly in position in the top plate. The base of the lamp is received in a socket 28, having two terminals 29 to which are soldered the leads to connect the lamp to the rest of the electrical components.

The upper face of the bulb 24 is coated with an opaque material 30, such as black lacquer, with the exception of a narrow straight slit 31 through which light is emitted, as may be seen in FIG. 3. Lines 32 are scribed on the top plate for accurately aligning the slit in the desired direction, for a purpose which will be explained hereinafter. When aligned, the flange 25 of the lamp is cemented to the top plate 20 as at 33 to prevent relative angular movement between the lamp and the top plate.

Also mounted on the top plate 20 is a photo conductive cell assembly 34. This assembly includes a bracket 35 secured to the top plate by a plurality of screws 36 and nuts 37. Depending from the bracket 35 is a stop 35a, the function of which will be explained below. A photoconductive cell 38 is cemented to the bracket 35 so as to be in spaced relation to and coaxial with the face of the bulb 24. Only a narrow linear strip 39 of the photoconductive cell (see FIG. 4) is sensitive to light, and the cell is positioned on the bracket 35 with the aid of a scribed line 40 and a notch 41 on the bracket, so that the strip 39 is directly opposite and parallel to the slit 31 of the bulb 24. A pair of leads 42 connect the photoconductive cell to the other electrical components, passing through suitable apertures in the bracket and top plate.

Referring now to FIGS. 1 and 5, adjustably mounted on the top plate 20 is a thermometer assembly 46 including a case 47 to which is secured coaxially thereof a cylindrical tube 48. Fixed to the tube at its junction with the case is a threaded sleeve 49. A bore 50 in the top plate receives the sleeve, and the thermometer assembly is releasably secured to the top plate by a lock washer 51 and two nuts 52 which threadedly engage the sleeve 49.

A scale plate 53 is adjustably secured to the inside of the case 47, and an appropriate temperature scale is registered on the scale plate as seen in FIG. 6. A pointer 56 having a relatively narrow indicating tip 58 and a broad tail portion 57 is mounted above the scale plate on a vertical shaft 55 which is rotatably supported by a bushing 43 within the tube 48. Also disposed within the tube 48 is a coiled bimetallic temperature sensitive element 54, one end of which is coupled to the lower end of shaft 55 and the other end of which is fastened to a hollow bushing 44 fixed within the tube 48. The element 54 angularly displaces the shaft 55, and consequently the pointer 56, in accordance with variation in temperature as is well known in the art. The indicating tip 58 of the pointer indicates the temperature to which the bimetallic element is exposed on the scale 53.

A glass cover 59 is secured to the case 47 by a suitable clamping ring 45, and the half of this cover over the non-indicating portion of the scale plate is painted with an opaque material such as black lacquer, indicated at 60. Aligned openings 53a and 47a are provided in the scale plate 53 and case 47, respectively, below the coated portion of the cover 59; see FIG. 6. As shown in FIG. 1, the thermometer assembly 46 is mounted on the top plate 20 so that the bracket 35 and the portion of the bulb 24 protruding from the top plate extend through the openings 53a and 47a. These openings are of such size and shape as to permit a rotation of the thermometer assembly 46 on the top plate 20 of approximately 30° without striking either the bulb 24 or the bracket 35. The broad tail portion 57 of the pointer 56 is suitably bent to permit it to pass freely between the bulb 24 and the photoconductive cell 38 without striking either.

With the thermometer assembly 46 mounted on the top plate 20, the tube 48 extends through aligned bores in the inner can 14, the heat sink 15, the base portion 12 and the bottom plate 18. A spacer 69 of thermally conductive material and a spacer 68 of thermally nonconductive material each slidably fit around the tube 48, abutting each other, and the inner can 14 and the sleeve 49, respectively. Thus when the thermometer assembly is mounted on the top plate, the inner can is retained in a fully seated engagement with the base portion. The spacer 68 is of such length as to extend to the upper end of the temperature sensitive element 54.

An outer cover plate 70 having an upstanding peripheral flange 71 is secured in spaced relation to the bottom plate by a plurality of short spacers 72. An outer cylindrical can 74, having a pluraltiy of laterally extending mounting ears 75 at its lower end also is provided with a circular opening at its upper end for accommodating the indicator dial portion of the apparatus. The lower end of the can 74 is secured by screws to the flange on the cover plate 70 to maintain the elements in proper assembly. Thermally insulating material 79 is provided within the outer can and cover plate as indicated in FIG. 1.

The electrical connections for the power transistor 17 and the device 11 are brought out by insulated terminals 62 passing through the base portion 12 and bottom plate 18, as shown in FIG. 1. A suitable socket 63 for the device 11 is also mounted thereon. If desired, non-heat-dissipating elements of the electrical circuitry may be mounted on the underside of bottom plate 18.

The outer cover plate is also provided with a plurality of terminals 64 to which are connected the various circuit components and conductors to be discussed in connection with FIG. 7. The leads from the lamp assembly 22 as well as the elements within the chamber 10 are also coupled via the terminals 64 to the power source and the remainder of the circuit. These circuit elements may be mounted above the lower end of the can 74 to permit mounting or may extend below as shown for mounting in a suitable aperture.

The electrical components for effecting the automatic temperature control are illustrated schematically in FIG. 7. Power is connected from A.C. source 82 to the primary coil of a step-down transformer 83 designed to provide a potential difference of, for example, 56 volts A.C. across the output terminals 84 of the secondary coil. To these outside terminals are connected the positive terminals of two crystal diodes 80, which may be the type designated CER 69, for example. The negative terminals of the two diodes are connected together at a terminal 85, and a terminal 86 is connected to a center tap on the transformer secondary coil. As will be recognized, the transformer 82 and the diodes 80 comprise a full wave rectifier, the output of which appears across the terminals 85 and 86, with terminal 85 being at positive polarity.

A resistor 87 is connected between the terminal 86 and a terminal 88, the bulb 24 being connected between the terminals 88 and 85. The resistor 87 may have a value of approximately 400 ohms, its purpose being to reduce the voltage applied across the bulb to approximately 14 volts. The bulb is designed to operate at 28 volts and would normally have a life of about 3000 hours. By operating it at 14 volts, its life becomes in excess of 100,000 hours. When operated at this reduced voltage, the bulb emits a reddish light. The operation of the apparatus is nevertheless still satisfactory, since the photoconductive cell 38 is sensitive to red light.

A thermistor 89 is also connected between the terminals 85 and 88 and is positioned in thermal contact with the resistor 87, both the thermistor and the resistor being disposed away from the chamber, preferably on the cover plate 70. The thermistor is chosen to have a negative temperature coefficient, and its resistance varies in inverse proportion to the power dissipated in the resistor 87 and to the ambient temperature external to the oven housing.

A resistor 90 is connected between the terminal 86 and a terminal 91, and the photoconductive cell 38 connects the terminals 85 and 91. The resistance of the photoconductive cell varies with the amount of light incident thereon, as is well known to the art, and consequently, the potential of the terminal 91 with respect to the terminal 86 varies in accordance with the amount of light striking the photoconductive cell. The resistor 90 may have a value of 33,000 ohms, and the photoconductive cell 38 may be of cadmium sulfide and have a resistance of 1 megohm or more in the absence of light, its resistance decreasing as the amount of incident light increases.

A resistor 92 is connected between the terminal 86 and the emitter of a power transistor 94, whose collector is joined to the terminal 85. The base of the transistor is connected to the terminal 91. The resistor 92 serves as a limiting resistor if one is required for the transistor and other circuit components chosen. With a power transistor of the type designated 2N2339 and the values of the other components as stated above, the resistor 92 is unnecessary. For purposes of illustration, the thermometer assembly 46 is indicated symbolically at Ⓣ on FIG. 7, thermally coupling the power transistor 94 (the heater for the chamber 10) with the pointer 56, whose broad tail portion 57 is pivoted so as to pass between the lamp 24 and the photoconductive cell 38.

In operation, during warmup the chamber 10 is below the desired temperature, and the pointer will initially be at one extremity of its angular displacement. The broad tail portion of the thermometer pointer thus is displaced from its central position in which it blocks light from the lamp from reaching the photoconductive cell and the latter is fully exposed to the light emitted through the slit 31 of the lamp. The resistance of the cell is thereby decreased, raising the potential of the terminal 91. Under these conditions, the base of the transistor is forward biased with respect to its emitter to an extent rendering the transistor fully conductive. A maximum of power is thus dissipated by the transistor, tending to raise the temperature in the chamber 10.

As the chamber nears the desired temperature, the broad tail portion 57 of the pointer begins to shade partially the photoconductive cell 38, changing the bias on the transistor to reduce the current through it and its power dissipation. Finally, when the desired temperature is reached, the broad tail portion so shades the cell that the power dissipation provided by the transistor is sufficient to supply only the heat necessary to maintain the temperature inside the chamber constant at the desired value. If for any reason the temperature in the chamber should rise above the desired value, the broad tail portion of the thermometer pointer would move further to prevent any light emitted through the lamp slit 31 from reaching the photoconductive cell. The stop 35a (best seen in FIGS. 1 and 2) prevents the pointer from being further displaced so as to permit more light to reach the photoconductive cell as the temperature increases.

The opaque coating 60 on the glass cover minimizes the amount of incident light at the cell, and with the cell completely shielded by the broad tail portion of the pointer from the bulb, the cell's resistance would be at its maximum value, in which case the transistor 94 becomes reversed biased and effectively non-conductive. The transistor will remain non-conductive until the temperature begins to fall below the desired temperature.

The amplification provided by the power transistor 94 results in a very brief warmup period for the apparatus and provides excellent temperature regulation in the chamber 10, since a slight change in the amount of light striking the photocell results in a large change in power dissipation. The aligned light emitting and light sensitive strips on the bulk and photocell respectively, and their proximity to each other, also contribute to the sensitivity of the temperature control. However, oscillation or hunting of the circuit about the desired temperature is avoided by reducing to a minimum the thermal resistance path between the heater (the power transistor 94) and the temperature sensitive element 54 of the thermometer. The heat sink 15, the inner can 14 and the base portion 12 are all preferably made of aluminum, an excellent heat conductor. In addition, the areas of contact between the inner can 14 and base portion 12, the heat sink and the thermometer tube 48, the inner can and the thermometer tube, and the power transistor and the heat sink are all coated with silicone grease to insure a low thermal resistance path between the transistor and the thermometer tube.

Variations in line or supply voltage and ambient temperature are automatically taken into account by the apparatus of the invention since both input voltage and temperature are used to control the circuit operation. An increase in line voltage will increase the lamp brightness and thus the current through the transistor. The resulting increase in temperature in turn causes the broad tail portion of the pointer to shade the photocell to a greater extent to maintain the power dissipation substantially constant. The converse effect is provided upon a decrease in line voltage.

Changes in the chamber temperature resulting from ambient temperature conditions or the heat dissipation of the device 11 in the chamber directly affects the thermometer element 46 and are thus taken into account in the normal operation of the control circuit.

A refinement in chamber temperature regulation against variations in ambient temperature and line voltage is provided by the thermistor 89. The thermistor is located externally of the chamber 10 and a rise in ambient temperature will decrease the resistance of the thermistor because of its negative temperature coefficient. Since the thermistor is connected in parallel with the bulb 24, its decrease in resistance lowers the current through the lamp. This results in less light being emitted by the lamp, a higher resistance in photoconductive cell 38, and less power dissipated by the transistor 94. Similarly, a drop in ambient temperature will cause a corresponding increase in heat dissipated by the transistor. A rise in line voltage will cause an increase in voltage across the resistor 87, increasing the power dissipated thereby. Inasmuch as the thermistor 89 is in thermal contact with the resistor 87, the temperature of the thermistor will rise and its resistance will fall, decreasing the current through the lamp and, therefore, the current through the transistor 94. Similarly, a drop in line voltage will cause a corresponding increase in the current through the transistor.

As has been previously described, the thermometer assembly 46 is adjustably secured to the top plate 20, and by loosening the two nuts 52 the thermometer assembly 46 may be rotated with respect to the bulb 24 and the photoconductive cell 38. Such rotation will change the value of temperature at which the chamber 10 will be maintained. Accordingly, the apparatus of the invention may be used to determine accurately the characteristics of temperature sensitive circuit components, such as the zero temperature coefficient of diodes. The pointer tip 58 always indicates the temperature within the oven chamber, permitting such determinations as well as providing a check on the operation of the chamber during warmup, the effects of any gross changes in line voltage, and the like. It is to be understood that the apparatus of the invention may be easily modified to provide a multitude of controlled temperature ranges. Thus a thermoelectric cooler may be employed to maintain the chamber at room temperature or below.

While the fundamental novel features of the invention have been shown and described, it will be understood that various substitutions, changes and modifications in the form and details of the apparatus illustrated and its manner of operation may be made by those skilled in the art without departing from the spirit of the invention. For example, a photovoltaic cell responsive to the light emitted by the bulb could be employed to control the power dissipated by a resistor disposed within the chamber. Moreover, the photoconductive cell, connected to a source of electric potential, could be disposed in the heat sink, and the bulb could be placed above the tail of the thermometer pointer, the bulb, thermometer pointer tail and cell being aligned as before, and the inner can being provided with a transparent top. Furthermore, a liquid-in-glass thermometer could be disposed between the bulb and the photosensitive cell, the liquid being opaque and the thermometer bulb extending into the chamber. All such variations and modifications, therefore, are included within the intended scope of the invention as defined by the following claims.

We claim:
1. Apparatus for controlling the temperature of an enclosed chamber comprising, means forming an enclosed chamber, a heat source including a power dissipating transistor disposed within said chamber, the amount of heat dissipated by said transistor being variable over a continuous range between predetermined minimum and maximum values and dependent upon the magnitude of the current flow therethrough, a coiled, bimetallic temperature sensing element in said chamber, a light source having means forming a straight slit for providing illumination along a line of limited length, a photocell having a light sensitive strip coextensive with said line of illumination, said light source and photocell mounted exteriorly of said chamber with said slit and said light sensitive strip spaced apart and facing each other in aligned relationship, opaque vane means of relatively broad extent with respect to said line of illumination mechanically coupled to said temperature sensing element, said vane means adapted to be angularly moved by said element and interposed between said light source and photocell to shade the latter to an extent dependent upon the temperature within said chamber, thereby to make the amount of light reaching said photocell dependent upon the chamber temperature, and electrical circuit means including said photocell for varying the current through said transistor.

2. Apparatus for controlling the temperature of an enclosed chamber comprising, means forming an enclosed chamber, a heat source including a power dissipating transistor disposed within said chamber, the amount of heat dissipated by said transistor being variable over a continuous range between predetermined minimum and maximum values and dependent upon the magnitude of the current flow therethrough, a coiled, bimetallic temperature sensing element in said chamber, a light source providing illumination along a line of limited length, a photocell having a light sensitive surface coextensive with said line of illumination, said light source and photocell mounted exteriorly of said chamber with said line of illumination and said light sensitive surface spaced apart and facing each other in aligned relationship, opaque vane means of relatively broad extent with respect to said line of illumination mechanically coupled to said temperature sensing element, said vane means adapted to be angularly moved by said element and interposed between said light source and photocell to shade the latter to an extent dependent upon the temperature within said chamber, thereby to make the amount of light reaching said photocell dependent upon the chamber temperature, and electrical circuit means including said photocell for varying the current through said transistor, said transistor being connected in an amplifier circuit and said photocell being coupled to its bias circuit.

3. Apparatus according to claim 2 further including in said amplifier bias circuit a thermally variable impedance element responsive to ambient temperature, whereby the heat provided in said chamber is adjusted in accordance with the ambient temperature.

4. Apparatus according to claim 1 wherein said vane means includes a pointer extension formed thereon and there is further provided a visible indicia plate disposed adjacent said pointer extension, whereby a visible indication correlated with the chamber temperature is provided.

5. Apparatus for controlling the temperature of an enclosed chamber comprising, means forming an enclosed chamber, a heat source including a power dissipating transistor disposed within said chamber, the amount of heat dissipated by said transistor being variable over a continuous range between predetermined minimum and maximum values and dependent upon the magnitude of the current flow therethrough, temperature sensing means in said chamber, a light source for providing illumination along a line of limited length, a photocell having a light sensitive surface coextensive with said line of illumination, said light source and photocell mounted exteriorly of said chamber with said line of illumination and said light sensitive surface spaced apart and facing each other in aligned relationship, opaque vane means of relatively broad extent with respect to said line of illumination controlled by said temperature sensing means and adapted to be interposed between said light source and photocell to shade the latter to an extent dependent upon the temperature within said chamber, thereby to make the amount of light reaching said photocell dependent upon the chamber temperature, electrical circuit means including said photocell for varying the current through said transistor over said range in accordance with the amount of light reaching said photocell, said transistor being connected in an amplifier circuit and said photocell being coupled to its bias circuit, a thermally variable impedance element responsive to ambient temperature in said amplifier bias circuit, whereby the heat provided in said chamber is adjusted in accordance with the ambient temperature, and a voltage supply for said light source and said amplifier circuit, said amplifier circuit including an impedance coupled to said voltage source and dissipating heat in accordance with the magnitude of the supply voltage, said thermally variable impedance element being mounted in thermal contact with said impedance, whereby the heat supplied to said chamber is stabilized with respect to changes in supply voltage.

References Cited by the Examiner

UNITED STATES PATENTS

| | | | |
|---|---|---|---|
| 2,218,502 | 10/1940 | Breitenstein | 236—69 |
| 2,870,318 | 1/1959 | Ford | 219—363 |
| 2,954,479 | 9/1960 | Cibelius | 219—501 |
| 3,071,676 | 1/1963 | Van Sandywk | 219—501 |
| 3,079,484 | 2/1963 | Shockley et al. | 219—501 |

RICHARD M. WOOD, *Primary Examiner.*

C. L. ALBRITTON, *Assistant Examiner.*